July 13, 1954  D. J. COCHRAN ET AL  2,683,287
APPARATUS FOR MAKING MULTIPOLE JUMPER ASSEMBLIES
Filed Dec. 30, 1950  2 Sheets-Sheet 1
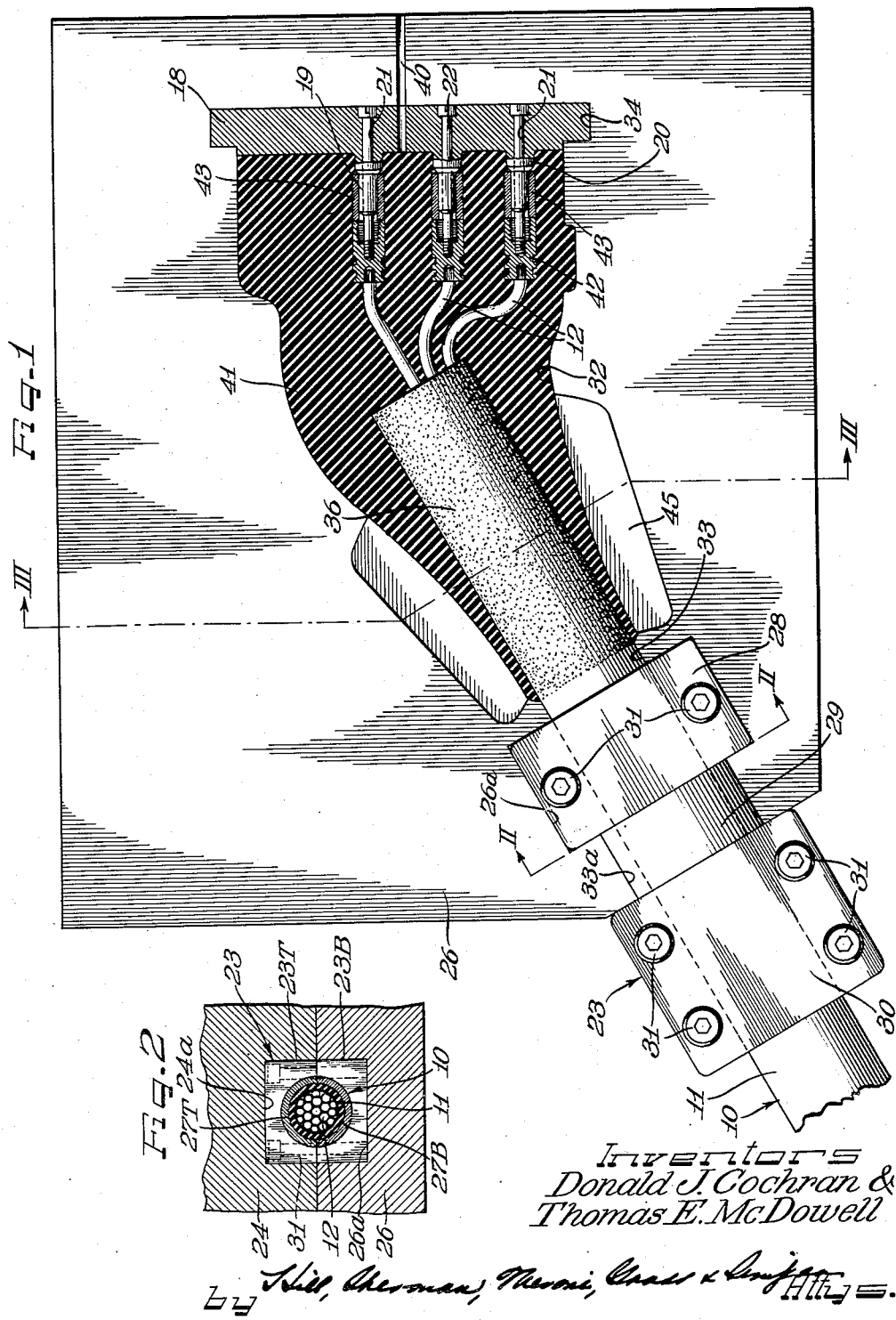
Inventors
Donald J. Cochran &
Thomas E. McDowell

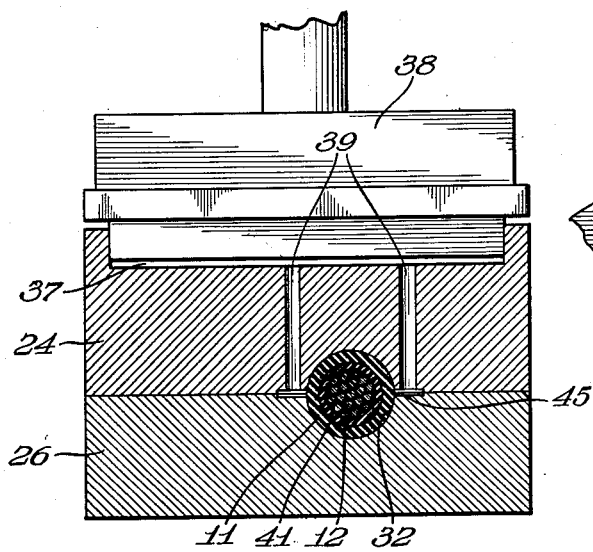
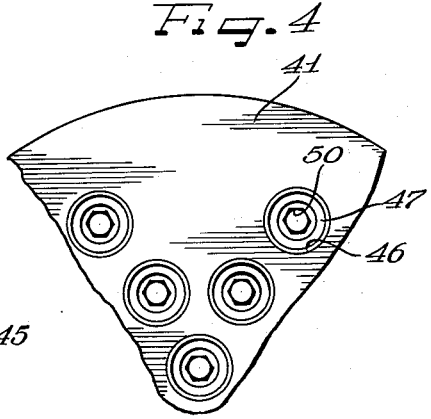
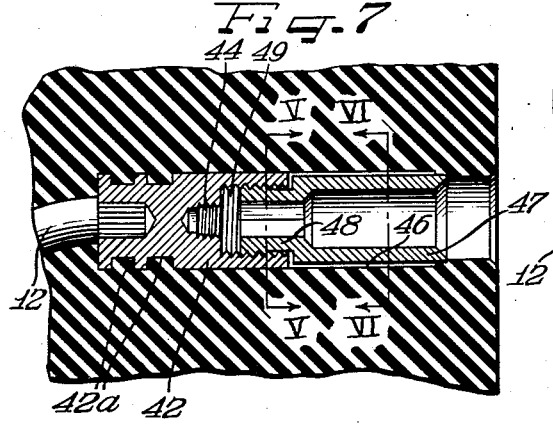
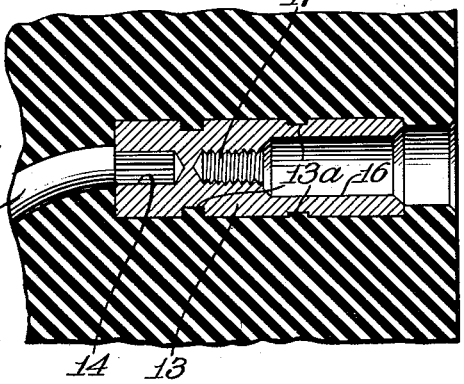
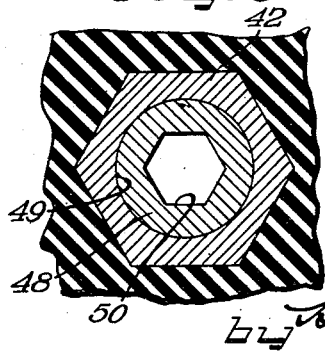
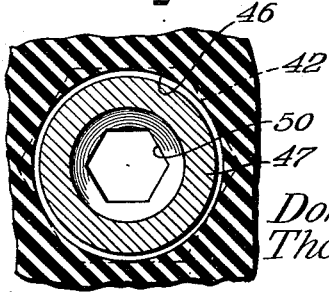
Inventors
Donald J. Cochran &
Thomas E. McDowell Patented July 13, 1954

2,683,287

UNITED STATES PATENT OFFICE 2,683,287

APPARATUS FOR MAKING MULTIPOLE JUMPER ASSEMBLIES

Donald J. Cochran and Thomas E. McDowell, Chicago, Ill., assignors to The Pyle National Company, Chicago, Ill., a corporation of New Jersey Application December 30, 1950, Serial No. 203,711

7 Claims. (Cl. 18—36)

This invention relates generally to electrical apparatus and more particularly to apparatus for molding a rubber connector body around the conductor ends of a multi-pole jumper assembly including an elongated rubber covered cable member.

According to the general features of the present invention, a rubber covered cable having a plurality of conductor elements therein may be provided on each end with a molded rubber connector body having a plurality of contact elements arranged in predetermined alignment therein.

One of the features of the present disclosure lies in the provision of a molding apparatus which includes a pair of complementary mold sections having a mold cavity with a cable-receiving opening formed along the parting line of the molding sections, the cable-receiving opening being provided with an enlarged keyway recess along the length thereof to receive a special clamp firmly assembled to the rubber covered cable. The clamp includes shoulder abutment means which are matingly locked within the keyway recess thereby insuring that the cable will not be pushed out of the mold cavity under the effects of molding pressure.

Another feature of the present invention lies in the provision of a front mold plate having a plurality of locator pins thereon by means of which a plurality of conductor elements of a rubber covered cable may be soldered to contact elements and arranged in predetermined alignment by means of a color code designation or the like. The front mold plate is received in a recess defined by the mold sections and is firmly retained in assembled relationship therewith when the mold is closed.

Yet another feature of the present invention lies in the provision of renewable front contact elements in the jumper assembly. In order to make such provision, the molding procedures contemplated include the positioning of a spacer sleeve between each one of a plurality of contact base elements soldered on the end of each of the conductor wires in the rubber covered cable and the front mold plate. The spacer sleeves are embedded in the rubber connector body molded around the conductor ends of the cable and are subsequently removed after the connector body is stripped from the mold so that a renewable type contact insert may be assembled with each of the contact base elements in the recesses formed by the spacer sleeves.

It is an object of the present invention, therefore, to provide apparatus for molding a connector body around the connector ends of a rubber-covered cable whereby the cable will not be pushed out of the mold by the effect of molding pressures.

Another object of the present invention is to provide an improved molding apparatus which will hold a cable in firm assembly therewith against the effects of molding pressures.

A further object of the present invention is to provide apparatus for molding a connector body around the conductor ends of a rubber-covered cable so that renewable type contact elements may be subsequently inserted upon the completion of the molding operation.

Many other advantages, features and additional objects of the present invention will become manifest to those versed in the art upon making reference to the detailed description which follows and the accompanying sheets of drawings, in which:

Figure 1 is a plan elevational view with parts shown in cross section of a lower mold section according to the present invention with a jumper assembly according to the present invention positioned therein and depicting the relationship of various components of the molding apparatus including a cable clamp and a front mold plate;

Figure 2 is a reduced fragmentary cross sectional view taken on line II of Figure 1;

Figure 3 is a reduced cross sectional view with parts shown in elevation taken substantially on line III—III of Figure 1;

Figure 4 is a fragmentary end elevational view of the jumper assembly provided in accordance with the present invention;

Figure 5 is an enlarged fragmentary cross sectional view taken on line V—V of Figure 7;

Figure 6 is an enlarged fragmentary cross sectional view taken on line VI—VI of Figure 7;

Figure 7 is an enlarged fragmentary cross sectional view showing a renewable type contact element; and Figure 8 is an enlarged fragmentary cross sectional view showing a non-renewable type contact element.

As shown in the drawings:

The multi-pole jumper assembly produced in accordance with the steps of the method to be disclosed herein finds a particularly useful application when employed as a train line connector, for example when employed as a line connector between the units of a multiple diesel electric locomotive or the like. Connectors provided for this purpose generally include a large number of contact elements, the end of the jumper serving as a plug to be received in a socket fitting permanently affixed to the vehicle.

It has been found desirable to provide contact elements in the jumper assembly which are easily replaceable and, to that end, the present invention includes as one embodiment thereof the method of fabrication whereby a multi-pole jumper assembly with renewable type contacts is produced. The general molding procedures necessary to the production of a multi-pole jumper assembly with non-renewable type contact elements will be described first of all, however.

A length of rubber-covered cable having a plurality of conductor wires extending therethrough is selected and the rubber insulation is stripped from a portion of the end thereof. In Figures 1 and 2 the cable is indicated generally by the reference numeral 10 and is shown as including an annular layer of rubber covering 11 which surrounds a plurality of conductors 12.

If non-renewable type contact elements are to be employed, such contacts are then soldered to the ends of each of the conductors 12 of the cable 10. In this connection, particular reference may be had to Figure 8 wherein is shown a conductor 12 having an non-renewable contact 13 soldered on the end thereof. It will be noted that the non-renewable type contact 13 is generally cylindrical and is provided with a recess 14 in one end thereof to receive the end of the conductor 12. A contact-receiving recess 16 is formed in the other end thereof and terminates in a reduced threaded bore 17, the utility of which will become manifest presently.

As is most clearly shown in Figures 1 and 4, a front mold plate 18 is provided in accordance with the present invention and has a plurality of locator pins 19 arranged in predetermined array on one face thereof. The locator pins 19 are provided with an enlarged shoulder 20 which constitutes a base portion directly adjacent the main body of the plate 18 and a hollow bore 21 extends through each of the locator pins 19 and through that part of the front mold plate 18 in registry therewith so that a screw fastener 22 may be passed through the mold plate and through each of the locator pins 19 whereupon the screw fastener 22 will be threadedly received by the threaded bore 17 of one of the non-renewable type contacts 13.

Each of the conductors 12 is preferably covered with an additional insulating material preferably marked in accordance with a predetermined color coding. Thus, the various locator pins 19 may be correspondingly marked by suitable indicia means so that each of the conductors 12 having a non-renewable type contact 13 on the end thereof may be connected to an appropriate locator pin 19 on the front mold plate 18.

As will be noted upon making particular reference to Figures 1 and 2, a clamp 23 is firmly assembled along the length of the cable 10 and may be locked in firm assembly with a top mold section 24 and a bottom mold section 26 through the provision of an enlarged keyway recess provided in the mold sections and arranged to receive a shoulder portion of the clamp 23.

The clamp 23 preferably takes the form of two identically formed halves 23t and 23b, each of the half sections of the clamp 23 being formed with a semi-cylindrical recess 27t and 27b respectively to snugly receive the rubber covered portion of the cable 10.

The clamp 23 is made up of three separate sections, there being a front key 28, a middle body portion 29 and a rear key 30. It will be understood that each of these three sections are made up by the respective half components of the clamp half 23t and 23b, and the halves 23t and 23b are assembled into connected relationship with the cable 10 by a pluurality of Allen-head screws 31 situated in the front and rear key portions 28 and 30 and which may be turned to radially collapse the clamp into firm engagement with the cable 10.

The bottom mold section 26 and the upper mold section 24 are each provided with a semi-cylindrical recess which extends from one end of the molding section into a recess provided in each of the molding sections to form a molding cavity 32. Such recess is indicated by the reference numeral 33 and it will be noted that a keyway recess 26a and a keyway recess 24a are actually formed as an enlargement of the cable recess 33, the cable recess 33 being further enlarged as at 33a to receive the central body portion 29 of the clamp 23.

The keyway recess 26a is spaced inwardly from one edge of the lower molding section 26 and the recess 24a is similarly situated in the upper mold section 24 so that the front key 28 of the clamp 23 will be received by the keyway recesses 24a, 26a and the rear key 30 will engagingly abut the edge of the molding sections 24 and 26.

At the other end of the molding cavity 32 is formed a recess 34 shown on Figure 1 in the bottom mold section 26 and a corresponding recess in the upper mold section 24 (not shown) to thereby provide a keyway for the front mold plate 18.

After the clamp 23 is placed in surrounding relationship to the cable 10, the conductors 12 are preferably bound with a piece of cord so as to confine same against misalignment. A portion of the cable insulation, for example that portion of the cable insulation between the front key 28 of the clamp 23 and the conductor ends of the cable 10 as is indicated by the reference numeral 36 on Figure 1, is coated with a rubber cement so as to promote bonding action.

Having thus prepared the end of the cable by assembling the clamp 23 on the cable 10 and placing all of the contacts 13 in firm assembly with the front mold plate 18, the clamp 23 and the front mold plate 18 are key positioned in the bottom mold section 26. Thereafter, the upper mold section 24 is lowered into position, the recesses being formed therein coacting with the front mold plate 18 and the clamp 23 to place all of the previously described elements in firm assembly within the mold sections 24 and 26.

Having closed the mold, a quantity of rubber is transferred into the molding cavity 32 by the well known rubber transfer process, a supply of rubber being disposed in a well 37 which is forced into the molding cavity 32 by a suitably powered ram 38 which forces the rubber through a plurality of sprues 39 leading from the well 37 to molding cavity 32.

As is clearly shown on Figure 1, the front mold plate 18 and the molding sections 24 and 26 preferably have a passageway 40 extending therethrough for the purpose of receiving a feeler which may be inserted through the passageway 40 to detect when the molding cavity 32 is completely filled with rubber transferred from the well 37.

The outlets for the sprues 39 shown at 45 can be situated in any location establishing free flow communication with the cavity 32 so that the transferred rubber will flow freely toward the front mold plate 18 and around the cable 10 and the conductors 12 as well as the contacts 13, thereby to form a molded rubber connector body 41 around the conductor ends of the cable 10.

With particular reference to Figure 8, it will be noted that the contacts 13 are provided with a pair of spaced annular grooves 13a and the locator pins 19 on the front mold plate 18 include a reduced diameter portion which insures that molded rubber will completely surround the contact elements 13 in intimate restraining relation so as to firmly locate each of the contacts 13 in predetermined alignment within the molded rubber connector body 41.

After the rubber transfer process is completed, the mold is broken and the finished jumper assembly is stripped from the various mold components.

In making a multi-pole jumper assembly with renewable type contacts, the basic method of production is fundamentally similar to that previously described. First of all the cable 10 is stripped and a plurality of contact base elements 42 are soldered to the bared ends of the conductors 12.

The front mold plate 18 having a plurality of locator pins 19 on one face thereof is again employed to place the conductors in a predetermined alignment together with the respective contact base elements. It should be noted, however, that the assembly of the conductors 12 with the front mold plate 18 actually consists of three separate operations. In order to provide a suitable recess in the molded connector body which is adapted to receive a renewable type contact, it is necessary first of all to situate a spacer sleeve 43 around each of the locator pins 19 and between the contact base elements 42 and the portion of the locator pin directly adjacent the front mold plate 18. Next, the contact base elements 42 are placed in abutment to the spacer sleeves 43 and on the locator pins 19 of the front mold plate 18 in accordance with a color code designation previously determined. Finally, a plurality of screws 22 are passed through the openings 21 of the front mold plate 18 and are turned into the tapped bores 44 of the contact base elements 42.

A clamp 23 is placed on the cable 10 in the same manner as previously described and the conductors 12 are bound with a cord to confine same against misalignment. A portion of the cable, for example, the portion indicated by the reference numeral 36 on Figure 1, is coated with a rubber cement to promote bonding whereupon the clamp 23 and the front mold plate 18 carrying the conductors 12 and the cable 10 are key positioned in the bottom mold 26.

The mold is then closed by lowering the top mold section 24 after which rubber is transferred into the mold cavity 32 in accordance with the well known rubber transfer process.

After the mold is broken, the jumper assembly is stripped from the mold, the clamp 23 is removed as is the front mold plate and each of the spacer sleeves 43 will remain in the molded jumper assembly after the screws 22 are turned out of the tapped bores 44 of the contact base elements 42. The spacer sleeves 43 are subsequently removed thereby leaving a recess 46 adjacent the end of each contact base element 42 to receive a front contact element 47 having a reduced threaded neck 48 which may be threadedly assembled in a threaded counterbore 49 formed in each of the contact base elements 42.

As is particularly shown in Figs. 5 and 7, the threaded neck portion 48 of the front contact element 47 is provided with a reduced hexagonal bore 50 which is adapted to receive a similarly shaped turning tool, thereby to facilitate assembly of the front contact elements 47 with the contact base elements 42.

It will be further noted upon making reference to Figures 5, 6 and 7 that the front contact elements 47 are preferably cylindrical in general overall configuration to facilitate rotational movement thereof in the recess 46 during the assembly operation with the contact base elements 42 and the contact base elements 42 are preferably hexagonal in configuration and are provided with annular grooves 42a in the peripheral surface thereof so that the molded rubber of the connector body 41 will firmly retain the contact base elements 42 in fixed aligned position.

In operation, the renewable front contact elements 47 may be selectively screwed into each of the contact base elements 42 whenever renewal is necessary or desirable.

Although we have resorted to detail in the description of our invention for the sake of clarity, it should be clearly understood that we wish to embody within the scope of this patent all such modifications as reasonably and properly come within the scope of our contribution to the art.

We claim as our invention:

1. A molding apparatus for molding a connector body around the conductor ends of a rubber-covered cable comprising complementary mold sections, each section having a mold cavity recess together forming a mold cavity for a connector body, each section having a front mold recess at one end of said mold cavity recess together forming a keyway to lock a front mold plate in firm assembly with the mold sections, each section having a clamp recess spaced adjacent the other end of said mold cavity recess and together forming a keyway to lock a cable clamp in firm assembly with the mold sections, each section having a cable recess extending from the cavity recess through the clamp recess and to one edge of the mold section and together forming a cable run by means of which the end of a cable may be inserted into the mold cavity, a front mold plate adapted to have a plurality of conductor ends of a rubber-covered cable assembled therewith receivable in said front mold plate recesses a cable clamp adapted to firmly clamp the rubber cable received in said clamp recesses, and complementary abutment shoulders provided by said mold sections together forming a wall between said clamp recesses and said mold cavity recesses to isolate said clamps from molding pressures in the mold cavity while retaining the cable in the molding apparatus against molding pressures developed in said cavity.

2. In a molding apparatus for molding a connector body around the conductor ends of a rubber-covered cable, the improvement of a cable clamp constructed to be firmly connected to the cable and a pair of relatively movable recessed molding sections together forming a molding cavity to receive the conductor ends of the cable and having a clamp receiving keyway, said keyway and said clamp providing intermating abutment means to lock said clamp in firm assembly with both of said molding sections, and wall means provided by said molding sections separating said cavity and said abutment means whereby the cable will be firmly retained in the molding apparatus against molding pressures developed in said cavity.

3. In a molding apparatus for molding a connector body around the conductor ends of a rubber-covered cable, a pair of complementary molding sections each having a complementary portion of a molding cavity formed therein with a cable-receiving recess extending to the margin of the sections from the cavity portion, whereby a cable may have its conductor ends positioned in the cavity, a clamp having an outwardly extending shoulder portion and constructed to be firmly connected to a rubber-covered cable passed therethrough and an enlarged keyway formed along the length of said cable-receiving recess in at least one of said molding sections to receive said shoulder portion, and wall means provided by said molding sections separating said keyway from said cavity whereby the cable will be firmly retained in the molding apparatus against molding pressures.

4. In a molding apparatus for molding a connector body around the conductor ends of a rubber-covered cable, a pair of complementary molding sections each having a complementary portion of a molding cavity formed therein with a cable-receiving recess extending to the margin of the section from the cavity portion, whereby a cable may have its conductor ends positioned in the cavity, a clamp having a pair of spaced outwardly extending shoulders and constructed to be firmly connected to a rubber-covered cable passed therethrough and an enlarged keyway formed along the length of said cable-receiving recess in at least one of said molding sections to receive one of said shoulders, said one molding section providing wall means adjacent said cable receiving recess separating said enlarged keyway from said cavity, the other of said shoulders arranged to abuttingly engage the margin of one of the molding sections, whereby the cable will be firmly retained in the molding apparatus against molding pressures.

5. In a molding apparatus for molding a connector body around the conductor ends of a rubber-covered cable, a pair of complementary molding sections each having a complementary portion of a molding cavity formed therein with a cable-receiving recess extending to the margin of the sections from the cavity portions, whereby a cable may have its conductor ends positioned in the cavity, a clamp comprising a pair of similar clamping elements constructed to embraceably engage a rubber-covered cable and connector screw means cooperable with said similar clamp elements to urge same into firm assembly with the cable, each of said similar clamp elements having an outwardly extending shoulder and an enlarged keyway formed along the length of said cable-receiving recess spaced outwardly of said cavity but inwardly of the outer edge in said holding sections to receive a corresponding one of said shoulders, whereby the cable will be firmly retained in the molding apparatus against molding pressures.

6. In a molding apparatus for molding a connector body around the conductor ends of a rubber-covered cable, a pair of complementary molding sections each having a complementary portion of a molding cavity formed therein with a cable-receiving recess extending to the margin of the section from the cavity portion, whereby a cable may have its conductor ends positioned in the cavity, a clamp comprising a pair of similar clamp elements constructed to embraceably engage a rubber-covered cable, connector screw means cooperable with said clamp elements to urge the same into firm assembly with the cable, each of said clamping elements having a pair of spaced outwardly extending shoulders and an enlarged keyway formed along the length of each of said cable-receiving recesses outwardly of said cavity but inwardly of the outside edge in said molding section to receive one of a corresponding one of said shoulders, the other of each of said shoulders arranged to abuttingly engage the margin of the molding sections, whereby the cable will be firmly retained in the molding apparatus against molding pressure.

7. A molding apparatus for molding a connector body around the conductor ends of a rubber-covered cable comprising complementary mold sections, each section having a mold cavity recess together forming a mold cavity for a connector body, each section having a front mold recess at one end of said mold cavity recess together forming a keyway to lock a front mold plate in firm assembly with the mold sections, each section having a clamp recess spaced adjacent the other end of said mold cavity recess and together forming a keyway to lock a cable clamp in firm assembly with the mold section, each section having a cable recess extending from the cavity recess through the clamp recess and to one edge of the mold section and together forming a cable run by means of which the end of a cable may be inserted into the mold cavity, a front mold plate adapted to have a plurality of conductor ends of a rubber-covered cable assembled therewith receivable in said front mold plate recesses, means on said front mold plate to form a recess adjacent the end of each conductor end to receive a removable front contact, and a cable clamp adapted to firmly clamp the rubber cable received in said clamp recesses, and complementary abutment shoulders provided by said mold sections together forming a wall between said clamp recesses and said mold cavity recesses to isolate said clamps from molding pressure in the mold cavity while retaining the cable in the molding apparatus against molding pressures developed in said cavity.

References Cited in the file of this patent

UNITED STATES PATENTS

| Number | Name | Date |
|---|---|---|
| 2,225,728 | Weidenman, Sr. | Dec. 24, 1940 |
| 2,297,336 | White | Sept. 29, 1942 |
| 2,382,200 | Brunner | Aug. 14, 1945 |
| 2,425,831 | Rozanek | Aug. 19, 1947 |
| 2,425,832 | Lubbert et al. | Aug. 19, 1947 |
| 2,433,373 | Krim | Dec. 30, 1947 |
| 2,454,193 | Martin | Nov. 16, 1948 |
| 2,457,796 | White | Dec. 28, 1948 |
| 2,473,570 | Chirelstein | June 21, 1949 |
| 2,497,757 | Bonnett | Feb. 14, 1950 |
| 2,604,661 | Karns | July 29, 1952 |